United States Patent
Lemma et al.

(10) Patent No.: US 9,129,142 B2
(45) Date of Patent: Sep. 8, 2015

(54) METHOD AND SYSTEM FOR GENERATING A REPRESENTATION OF A FINGER PRINT MINUTIAE INFORMATION

(75) Inventors: Aweke Negash Lemma, Eindhoven (NL); Thomas Andreas Maria Kevenaar, Eindhoven (NL); Dirk Jeroen Breebaart, Eindhoven (NL); Antonius Hermanus Maria Akkermans, Eindhoven (NL)

(73) Assignee: Genkey Netherlands B.V., Eindhoven (NL)

( * ) Notice: Subject to any disclaimer, the term of this patent is extended or adjusted under 35 U.S.C. 154(b) by 155 days.

(21) Appl. No.: 13/517,464

(22) PCT Filed: Dec. 23, 2010

(86) PCT No.: PCT/NL2010/050888
§ 371 (c)(1),
(2), (4) Date: Aug. 8, 2012

(87) PCT Pub. No.: WO2011/078678
PCT Pub. Date: Jun. 30, 2011

(65) Prior Publication Data
US 2012/0308093 A1    Dec. 6, 2012

(30) Foreign Application Priority Data
Dec. 24, 2009 (NL) .................................... 1037589

(51) Int. Cl.
*G06K 9/00* (2006.01)
(52) U.S. Cl.
CPC ....................... *G06K 9/00* (2013.01)

(58) Field of Classification Search
None
See application file for complete search history.

(56) References Cited

U.S. PATENT DOCUMENTS

| 7,813,561 | B2 * | 10/2010 | Jia et al. | 382/225 |
| 2005/0084143 | A1 * | 4/2005 | Kramer et al. | 382/125 |
| 2007/0266427 | A1 | 11/2007 | Kevenaar et al. | |

OTHER PUBLICATIONS

Zhao et al., "Non-Alignment Fingerpirnt Matching Based on Local and Global Information", IEEE Computer Society, ICICIC'06, 2006, pp. 1-4.*
Yang, H., Jiang, X., & Kot, A. C. (Aug. 2009). Generating secure cancelable fingerprint templates using local and global features. In Computer Science and Information Technology, 2009. ICCSIT 2009. 2nd IEEE International Conference on (pp. 645-649). IEEE.*

(Continued)

*Primary Examiner* — Sumati Lefkowitz
*Assistant Examiner* — David Perlman
(74) *Attorney, Agent, or Firm* — Smith Gambrell & Russell LLP

(57) ABSTRACT

The invention relates to a method for generating a representation of a finger print minutiae information. The invention also relates to a method for generating a representation of a finger print for biometric template protection purposes Biometric template protection techniques provide technological means to protect the privacy of biometric reference information stored in biometric. systems These methods stand in sharp contrast to approaches where biometric information is protected only by legislation and procedures around storage facilities. These systems are not reliable as they are susceptible to human and procedural errors. Template protection guarantees the protection of biometric information without the assumption that individuals are trusted or procedures are properly implemented.

12 Claims, 4 Drawing Sheets

(56) References Cited

OTHER PUBLICATIONS

Jiang, X., & Yau, W. Y. (2000). Fingerprint minutiae matching based on the local and global structures. In Pattern Recognition, 2000. Proceedings. 15th International Conference on (vol. 2, pp. 1038-1041). IEEE.*

The International Search Report released by the European Patent Office on Feb. 25, 2011 for PCT/NL2010/050888.

Chan, K.C., et al., "Fast Fingerprint Verification Using Subregions of Fingerprint Images," IEEE Transactions on Circuits and Systems for Video Tech., vol. 14, No. 1, Jan. 2004.

* cited by examiner

US 9,129,142 B2

METHOD AND SYSTEM FOR GENERATING A REPRESENTATION OF A FINGER PRINT MINUTIAE INFORMATION

CLAIM OF PRIORITY

This application is the National Stage filing under 35 U.S.C. 371 of International Patent Application No. PCT/NL2010/050888 filed on Dec. 23, 2010, which claims priority from Netherlands Application No. 1037589 filed on Dec. 24, 2009, all of which are incorporated by reference herein in their entirety.

The invention relates to a method for generating a representation of a finger print minutiae information.

The invention also relates to a method for generating a representation of a finger print for biometric template protection purposes.

Biometric template protection techniques provide technological means to protect the privacy of biometric reference information stored in biometric systems. These methods stand in sharp contrast to approaches where biometric information is protected only by legislation and procedures around storage facilities. These systems are not reliable as they are susceptible to human and procedural errors. Template protection guarantees the protection of biometric information without the assumption that individuals are trusted or procedures are properly implemented.

Template protection techniques transform classical representations of biometric references (e.g. the image of an iris, a feature vector derived from a face, etc.) into a so-called secure template. These secure templates are constructed such that it is very hard to retrieve information regarding the original biometric sample. Furthermore, matching is done directly on the secure template. Lastly, in many implementations of template protection it is possible to derive several distinct secure templates from a single biometric characteristic (renewability).

Template protection brings huge benefits for biometric systems. Centralised database can be constructed in compliance with privacy laws. Distinct templates from the same biometric characteristic can also be generated for different applications, in order to reduce/eliminate possibility of cross matching. Revocation and reissue is feasible in the case of such template compromise. Risks of spoofing attack using stored or transmitted template can also be prevented.

Template protection is based on the application of cryptographic hash functions that are applied on a binary string representation of the biometric reference information. The three basic properties of a cryptographic hash function are that it is a one-way function (pre-image resistance), that it is difficult to find a second hash input that yields the same value as for a given hash input (second pre-image resistance), and that it is difficult to find two inputs that yield the same value (collision resistance).

A powerful method for privacy protection is a so-called helper-data approach. In the helper data approach, the result of biometric template protection is a unique string (the so-called Pseudo Identity) and the public helper data (Diversification Code). It is of crucial importance in this context that this unique string is protected since knowledge of that secret would allow an attacker to reveal a substantial amount of biometric information from the public helper data. The general objective is thus to generate a bit string that is irreversibly derived from a biometric template.

To allow more flexibility a second level of bit strings, or pseudo-identities, may be introduced. These are derived from the first bit string and not directly from the biometric template. The basic requirements may be repeated, i.e., absolute irreversibility and unlinkability.

The use of fingerprints for verification is especially interesting given the good verification performance and the low-cost sensors. Basically two approaches can be pursued when using fingerprints: shape-based matching and minutiae matching.

For shape-based matching, the pattern of ridges is used as a 2D image and compared against another 2D image. In most cases, dedicated alignment methods (to resolve possible translation and rotations that may occur during various measurements) are required to obtain good performance.

For minutiae-based matching, the minutiae locations, possibly accompanied by other information such as a minutiae type (ridge ending or bifurcation), minutiae orientation, quality, are used to compare fingerprints.

Such comparison technique is for example described in "Fast Fingerprint Verification Using Subregions of Fingerprint Images" by K. C. Chan, Y. S. Moon and P. S. Cheng (IEEE Transactions on Circuits and Systems for Video Technology, Vol. 14, No. 1, January 2004). During enrollment a fingerprint image is captured and minutiae are extracted and stored. For verification purposes a fingerprint image is captured again and the extracted minutiae information is compared with the stored minutiae information. In order to improve the processing speed a subregion of the fingerprint is used for capturing and authentication purposes.

When using template protection, however, the minutiae-based matching has two major difficulties.

First, a list of minutiae locations and their attributes do not form a sampled function in a well defined coordinate system. For template protection schemes, however, the feature data should be represented as a sampled function in a well defined coordinate. This hence requires a conversion from minutiae location to a fixed-length, sample domain feature vector.

Furthermore, since template protection prohibits access to the original data (such as minutiae locations), it is impossible to align enrolment and verification data. Hence any processing to resolve translations, rotations, scaling and/or non-linear transformations should either be mitigated during the transformation process or performed as pre-processing step during template generation, rather than an alignment step during matching.

Even without template protection, the conversion of unordered, variable-length data into a fixed-length, sample domain feature set has benefits in terms of matching efficiency since relatively simple and fast matching algorithms can be employed.

It is noted that US20070266427A1 discloses a method to generate a fixed-length, sample domain feature set from a set of minutiae locations in a finger print. This method creates a 2D pattern of minutiae density functions that is subsequently processed in the frequency domain to result in a translation-invariant representation. However the method according to US20070266427A1 have the following shortcomings. First is requires a very large data size, but it is also very sensitive to rotational distortion. Moreover it involves a number of computationally complex operations.

In this application we mitigate at least one of the shortcomings of the method specified in US20070266427A1.

According to the invention the method is characterized by the steps of:
  obtaining minutiae information such as locations, orientation, type and quality;
  obtaining at least one reference point P in said finger print;
  determining sampled minutiae function values using said minutiae information and said reference point;

generating a vector representation based on said sampled minutiae function values.

Likewise the system according to the invention is characterized in that it comprises
- capturing means for capturing the finger print of a person;
- image processing means arranged for processing said finger print being captured in a finger print image; as well as
- determining said minutiae locations in said finger print image;
- determining at least one reference point P in said finger print;
- determining ordered minutiae values as functions of said minutiae parameters and relative minutiae locations with respect to said reference point and
- generating a vector representation based on said distinct distance values.

The use of such a reference point considerably improves performance of a minutiae transformation function and also reduces the complexity of the feature representation and its derivation. Furthermore by incorporating the orientation of the minutiae locations with respect to the reference point improves the sensitivity to rotational errors. Moreover, as the resulting feature is very compact, it enables an efficient method for use in biometric encryption and protection.

More particularly the method and system are characterized by the features of:
- defining an imaginary circle $C_R$ around said reference point P;
- projecting each minutiae location on said imaginary circle;
- determining the distinct projected value of each minutiae location as a feature vector;
- generating said vector representation based on said feature vectors.

The essential feature of the invention is to employ a circular representation of minutiae density functions using a stable reference point. Such a reference point could be the location of a core, a delta, a weighted average of minutiae coordinates, or alike. The use of such a reference point results in (1) a translation-invariant presentation, and (2) a relatively simple (1D but preferably complex-valued) representation of minutiae and (3) a representation that allows the use of minutiae orientation information as integral part of the presentation, and (4) enables the formation of a reference coordinate system for a sample domain representation.

These and other aspects of the invention will be further elucidated and described with reference to the drawings.

BRIEF DESCRIPTION OF DRAWINGS

Throughout the drawings, the same reference numeral refers to the same element, or an element that performs the same function.

Figure 1:
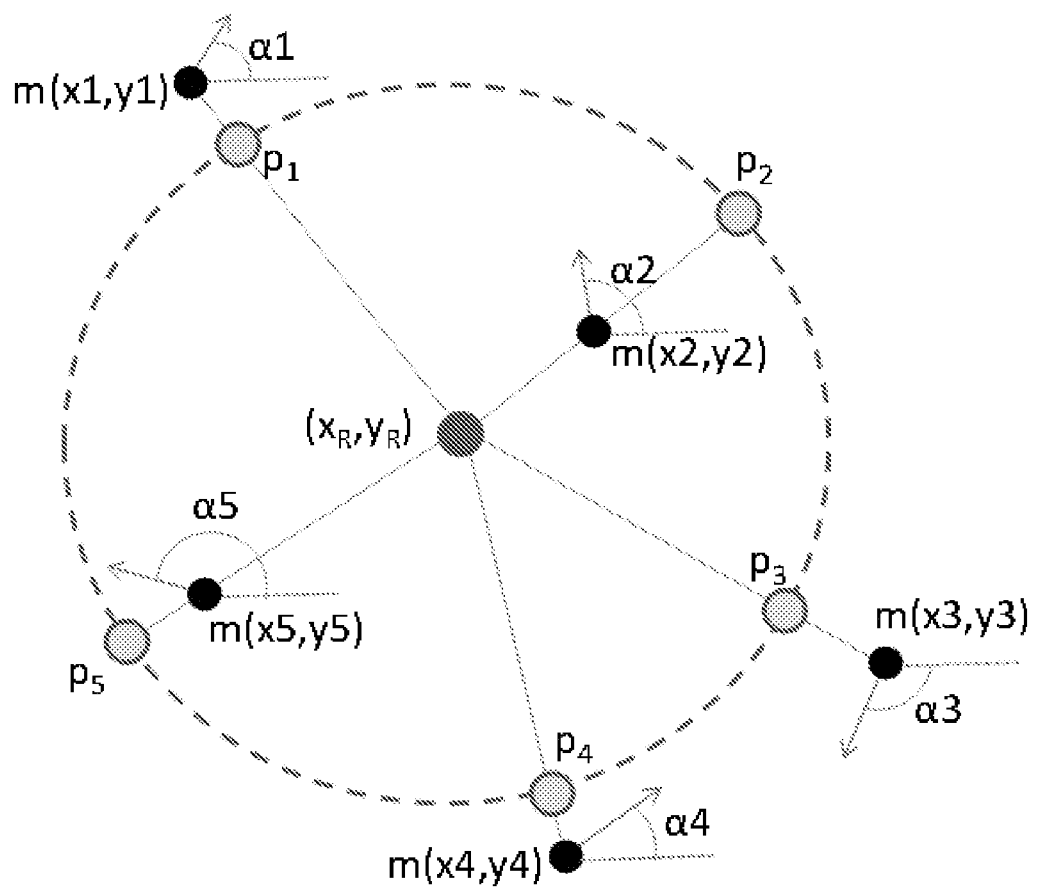
FIG. 1 is a graph of a set of minutiae locations given by the coordinates $x_i$, $y_i$ and a minutia orientation angle is given by $\alpha_i$ for minutia index i (i=1, . . . , 1).
Figure 2:
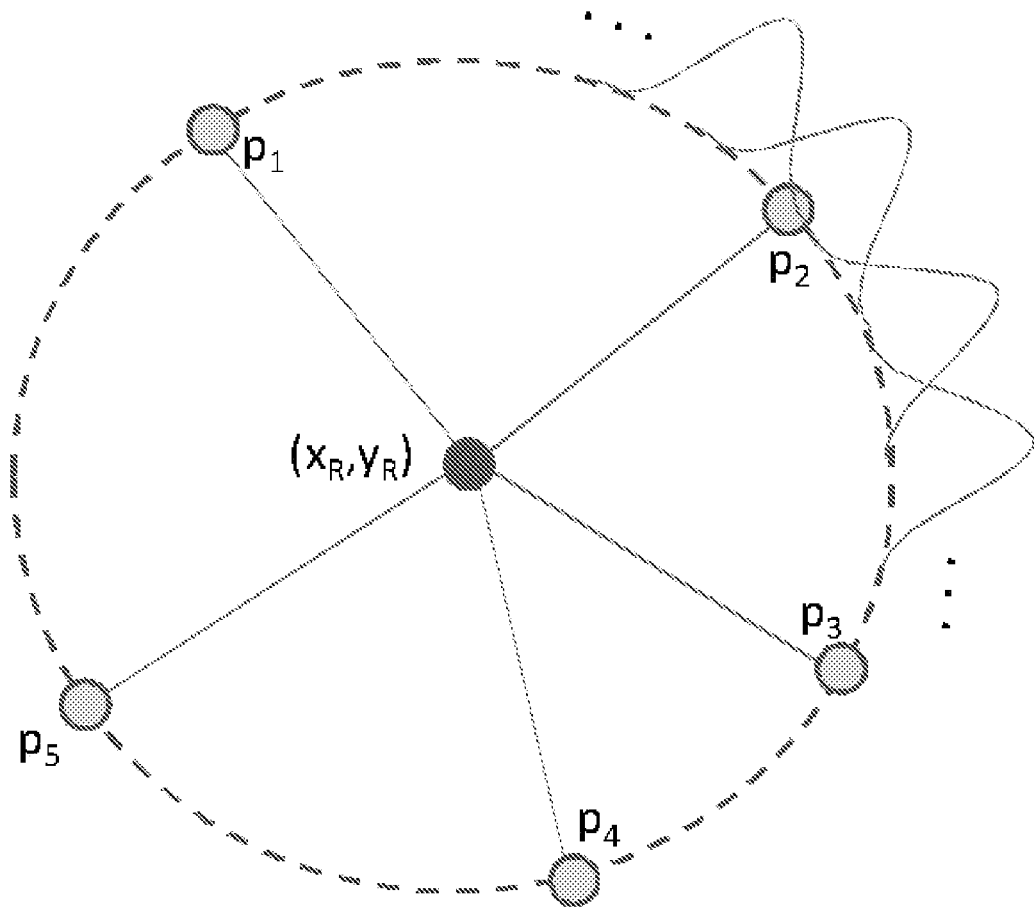
FIG. 2 is an examples of the spatial filters drawn on the circle $C_R$.
Figure 3:
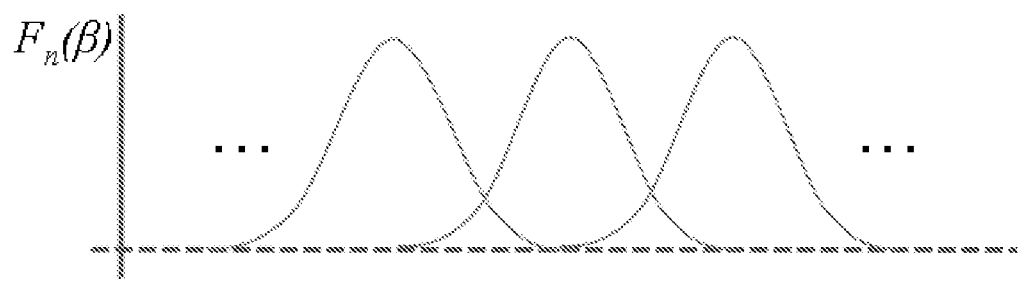
FIG. 3 is a visualization of the spatial filters in one dimension.

In the FIG. 1, for minutia index i (i=1, . . . , 1), a set of minutiae locations is given by the coordinates $x_i$, $y_i$ and a minutia orientation angle is given by $\alpha_i$, (see FIG. 1). A reference point is defined by the coordinate $x_R$, $y_R$. This reference point sets the origin of a coordinate system from which the set of minutiae locations with coordinates $x_i$, $y_i$ are defined. For n=1, 2 . . . N, a set of circular spatial filters $F_n(\beta)$ are defined that form (preferably partially overlapping) analysis windows on the circle $C_R$ centered at the reference point $x_R$, $y_R$, where $\beta$ is an angle argument, with $-\pi \leq \beta \geq \pi$. Examples of the spatial filters drawn on the circle $C_R$ are shown in FIG. 2. Visualization in one dimension is shown in FIG. 3.

In one preferred embodiment the output of each spatial filter $G_n$ is obtained by summing the contribution of each minutia point taking into account the following three parameters:
1. the distance of each minutia with respect to the reference point using a distance variation function $w(d_i)$,
2. the spatial filter weight $F_n(\beta)$ and
3. the orientation $\alpha_i$ of the minutia More specifically, in the preferred embodiment, $G_n$ is given by:

$$G_n = \sum_i F_i(\beta_i) w(d_i) \exp(j(\alpha_i - \beta_i))$$

where $d_i$ is the distance between the location of minutia i and the reference point $x_R$, $y_R$:

$$d_i = \sqrt{(x_i - x_R)^2 + (y_i - y_R)^2}$$

$\beta_i$ is the angle of the minutia location with respect to the reference point $x_R$, $y_R$:

$$\beta_i = \arctan\left(\frac{y_i - y_R}{x_i - x_R}\right)$$

and the distance variation function $w(d_i)$ is preferably a monotonically increasing or decreasing function with distance, and is zero for large distances to exclude outlier minutiae locations.

$G_n$ has the following unique properties that make it suited for efficient biometric classification and template protection applications.
1. It exists in a common sample domain, enabling simple sample-wise vector comparison between different measurements.
2. It has a graceful property in that missing minutiae points do not affect its values significantly.
3. Minutiae attributes such as minutiae direction, type and quality are embedded into the function values.

Various features can be deduced from the values $G_n$. For example, one could use the absolute value of $G_n$ as an orientation-invariant minutiae distance density, the real part of $G_n$ as a distance density for minutiae that have an orientation perpendicular to the projection axis, and the imaginary part of $G_n$ as the distance density of minutiae with an orientation that is parallel to the projection axis.

The features can then be collected into a vector to form feature vectors. For instance a feature vector FV(|G|) can be formed as $$FV(|G|) = [|G_1| |G_2| \ldots |G_N|]$$

Similarly, features derived from $G_n$ such as the orientation or magnitude density etc, or $G_n$ itself can be used to construct feature vectors.

Further extension of a feature vector may comprise the variance of minutiae orientations within the spatial segments.

Let $N_n$ be the number of minutia in the n-th spatial segment, then these can be obtained as follows:
with $S_{n,RE}$ the variance in the direction perpendicular to the projection axis, and $S_{n,IM}$ the variance parallel to the projection axis.

Finally, additional fingerprint attributes such as the total number of minutiae, the orientation of the reference point, the number of deltas and cores can be used as additional feature data.

In some situations, it is preferable to combine minutiae representations obtained using several different stable reference points into a single representation. For instance, a set of representations obtained using different minutiae locations as reference points can be combined to form a single minutiae representation. To be more specific, for k=1 ... K, let $S_{n,k}$ represent a feature obtained by taking the k-th minutiae as the reference stable point. Then, in one preferred embodiment a feature $S_n$ is obtained as a linear combination of $S_{n,k}$, i.e., $$S_{n,RE} = \frac{1}{N_n}\sum_i F_n(\beta_i)(w(d_i)\cos(\alpha_i - \beta_i))^2 - \left(\sum_i F_n(\beta_i)(w(d_i)\cos(\alpha_i - \beta_i))\right)^2$$

$$S_{n,IM} = \frac{1}{N_n}\sum_i F_n(\beta_i)(w(d_i)\sin(\alpha_i - \beta_i))^2 - \left(\sum_i F_n(\beta_i)(w(d_i)\sin(\alpha_i - \beta_i))\right)^2$$

$$S_n = \frac{1}{N}\sum_{k=1}^{K} \eta_k S_{n,k}$$

where $\eta_k$ is a weight function that is chosen by, for example, taking into account reliability of the reference point.

In one preferred embodiment, the minutiae are grouped into clusters according to their radial distance from the reference stable point (or any other clustering method). In this case, each cluster is independently used to generate a feature vector. Subsequently, the individual feature vectors generated using the different clusters are combined to form a single minutiae representation feature vector.

Figure 4:
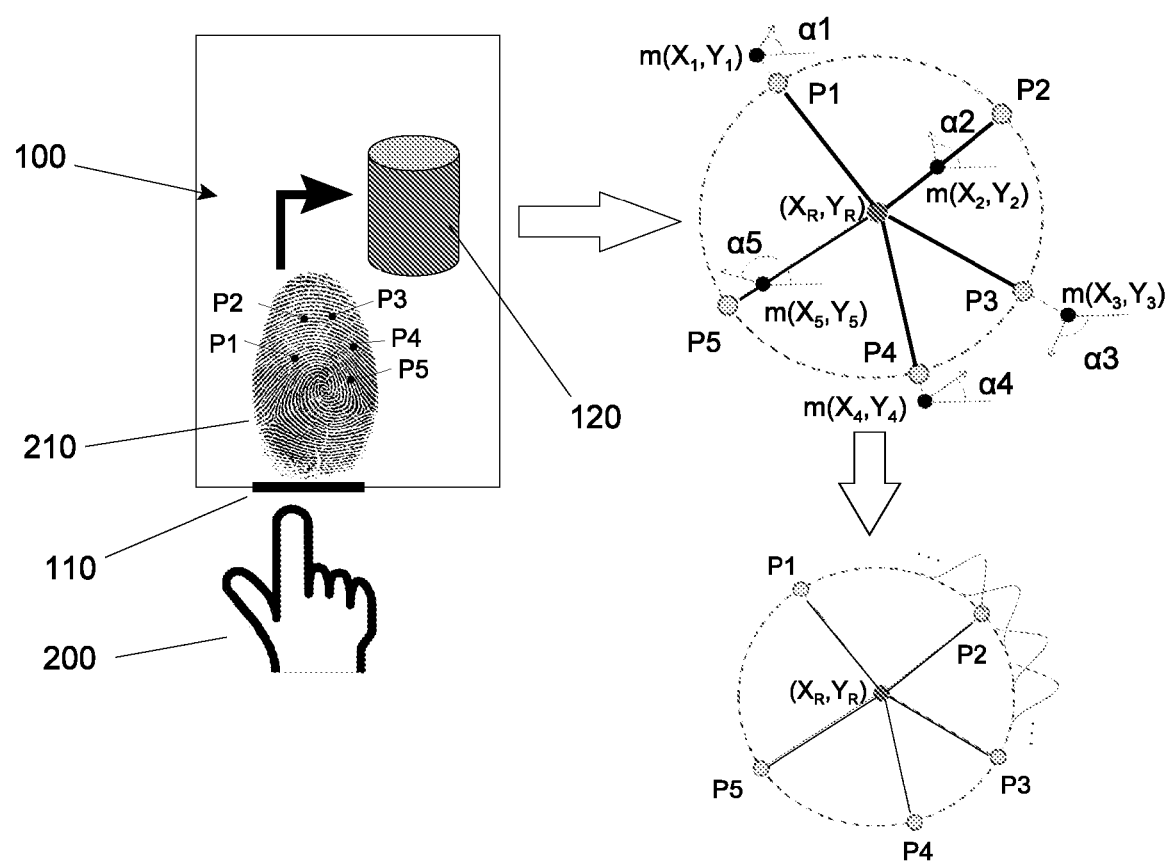
FIG. 4 is a device incorporating the aspects of the invention.

A device incorporating the aspects of the invention is disclosed in FIG. 4 and is denoted with reference numeral 100. The device 100 can be a hand held device or an access control device. The invention can be incorporated in for example a biometric voting device and comprises capturing means 110 for capturing the finger print 210 of a person's finger 200.

The processing means 120 are arranged for generating a template based on the captured finger print 210 according to the principles of the invention. According to the invention said processing means 120 can locate or determine one or more minutiae locations in said finger print 210 being captured and to define at least one reference point Pin said finger print 210 as depicted in FIGS. 1 and 2.

Next for each determined minutiae location ordered minutiae values are calculated as a function of minutiae parameters and relative minutiae locations with respect to the reference point P.

Subsequent the device generates a vector representation based on said distinct distance values.

The invention claimed is:

1. Method for generating a representation of a finger print minutiae information comprising the steps of:
    obtaining said minutiae information; obtaining at least one reference point P in said finger print; determining a coordinate system based on said reference point P;
    determining sampled function values of said minutiae information in said coordinate system, wherein each sampled function value contains at least the minutiae locations and orientations with respect to said reference point P embedded using a pre-defined set of spatial filters;
    generating a vector representation based on said sampled function values.

2. Method according to claim 1, wherein said coordinate system is characterized by the step of:
    defining a circle $C_R$ around said reference point P.

3. Method according to claim 1, wherein said sampled function values are characterized by the steps of:
    determining distinct feature sample values by projecting said minutiae information on to said circle CR;
    generating a feature vector representation based on said distinct feature sample values.

4. Method according to claim 1, characterized by the step of using a plurality of said reference points P to generate a plurality of feature vectors.

5. Method according to claim 4, characterized by the step of combining said plurality of feature vectors into a single feature vector.

6. Method according to claim 5, wherein said combination of said plurality of feature vectors is a linear combination of the individual vectors.

7. Method according to claim 1, wherein said reference point P is at least one or a group of
    single or multiple core points of the finger print;
    single or multiple delta points of the finger print; single or multiple minutiae locations;
    a mass center of a finger print image; a mass center of minutiae locations.

8. Method according to claim 1, wherein said minutiae information comprises at least one or more of
    a minutiae direction;
    a minutiae type;
    a minutiae quality;
    location information of said minutiae with respect to said reference point P.

9. Method according to claim 1, wherein the minutia are grouped into a plurality of distinct sets, and the contribution of said plurality of distinct sets are merged into independent feature vectors or combinations thereof.

10. Method according to claim 9 wherein said clustering is achieved according to their radial distance from the reference stable point.

11. A system for generating a representation of minutiae locations in a finger print comprising;
    capturing means for capturing the finger print of a person;
    image processing means arranged for
        processing said finger print being captured in a finger print image; as well as
        determining said minutiae locations in said finger print image;
        determining at least one reference point P in said finger print image;
        determining ordered minutiae values as functions of minutiae parameters and relative minutiae locations with respect to said reference point, wherein each ordered minutiae value contains at least the minutiae locations and orientations with respect to said reference point P embedded using a pre-defined set of spatial filters; and
        generating a vector representation based on said ordered minutiae values.

12. A method for generating a representation of a finger print minutiae information comprising the steps of:
    obtaining said minutiae information;

obtaining at least one reference point P in said finger print;

determining a coordinate system based on said reference point P and defining a circle $C_R$ around said reference point P;

determining sampled function values of said minutiae information in said coordinate system, wherein each sampled function value contains at least the minutiae locations and orientations with respect to said reference point P embedded using a pre-defined set of spatial filters, the step characterized by determining distinct feature sample function, the step characterized by determining distinct feature sample function values by projecting said minutiae information on to said circle $C_R$; and generating a feature vector representation based on the said distinct feature sample values.

* * * * *